May 2, 1944.     M. W. HANKS     2,347,825
VAPORIZER
Filed Nov. 1, 1940
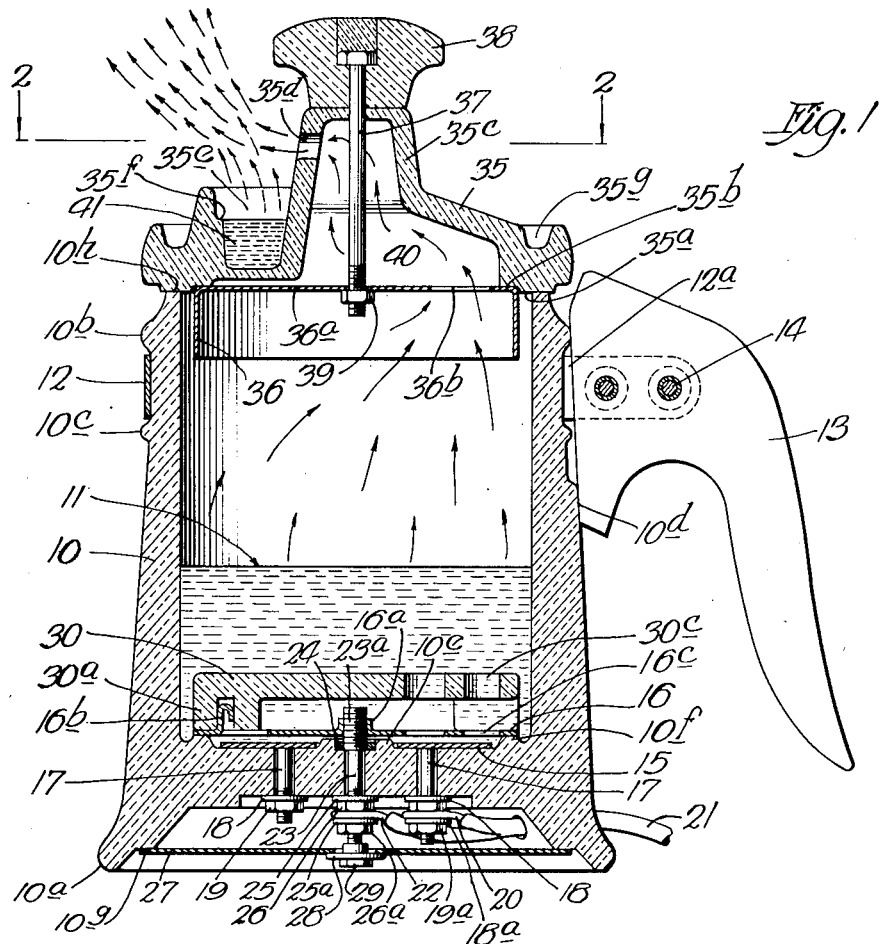
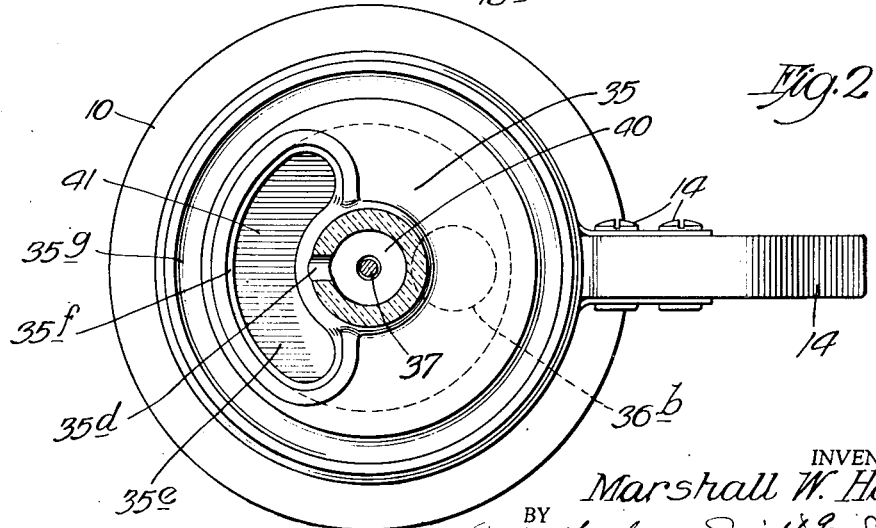
INVENTOR.
Marshall W. Hanks
BY Davis, Lindsey, Smith & Shonts
ATTYS.

Patented May 2, 1944

2,347,825

UNITED STATES PATENT OFFICE 2,347,825

VAPORIZER

Marshall W. Hanks, Madison, Wis., assignor to Hankscraft Company, Madison, Wis., a corporation of Wisconsin Application November 1, 1940, Serial No. 363,839

11 Claims. (Cl. 21—119)

This invention relates to improvements in vaporizers adapted for use in effecting the inhalation of steam for the treatment of the common cold. The invention is of particular value where it is desired to heat and vaporize a medicament and to cause this vapor to mingle with the steam.

It has been common in prior vaporizing devices to place the medicament, such as benzoin, eucalyptus, menthol and the like, in the water to be vaporized or in a vessel or recess located in the interior of the device in such a position that the vapor of the medicament is carried along by the steam on its way to a discharge orifice or spout. In some instances, a quantity of gauze wadding is saturated with the medicament and placed in a recess in the steam chamber. In general, it has been found that medicaments leave a glue-like deposit upon vaporization and this is difficult to remove, besides causing the gauze, if any is used, to adhere to the interior of the vessel while at the same time coating the surfaces of the inner chamber, the joints, fastening devices and cover, so that it is difficult to take the apparatus apart or to clean it. This is particularly objectionable when it is desired to use the device with a different medicament, but it also interferes with the operation of placing a new charge of the same medicament in the vessel.

The principal object of the present invention is to overcome the disadvantages mentioned above by providing an improved vaporizer by which the mixing of the steam and the medicated vapor is effected on the outside of the water-containing vessel so that the interior surfaces and passages of the device are subjected only to the action of water and steam. A further object is to provide a vaporizer comprising a steam generating vessel and a receptacle for a medicament on the outside of the vessel, in combination with means for discharging steam over the surface of the medicament in said receptacle. Another object of the present invention is to provide an improved vessel equipped with a medicament-containing receptacle which may be cleaned or refilled without removal of the cover of the vessel, which is preferably maintained in place on the vessel by gravity only so that it may be readily removed to permit the introduction of the water to be vaporized. Still another object is to provide a vaporizing device comprising a steam generating chamber having a cover with a medicament-containing recess adapted to be heated from the steam chamber and to discharge its vapor in the region of a steam discharge orifice in the cover. A further feature is the provision of means for preventing the medicament from creeping over the external surfaces of the vaporizer and getting into the interior thereof. Still another object of the invention is to provide a vaporizer having a simplified cover, formed preferably of molded insulating material, which is held in place by gravity only and formed as a unitary structure having a ground fit on the water-containing vessel and having an integral pocket or recess for containing the medicament. Other objects relate to various features of construction and arrangement which will appear more fully hereinafter.

The nature of the invention will be understood from the following specification, taken with the accompanying drawing, in which one embodiment is illustrated. In the drawing, Figure 1 shows a vertical central section through one form of a vaporizer embodying the features of the present invention; and Fig. 2 shows a horizontal section through the apparatus taken on the line 2—2 of Fig. 1.

As illustrated in the drawing, the invention is embodied in a vaporizer comprising a vessel 10, formed preferably of porcelain or other insulating material, and adapted to contain a quantity of water to be vaporized, the surface of this water being indicated at 11. The vessel 10 is provided at the bottom with an annular outwardly flaring flange 10ª adapted to rest upon a table or other support, and it is provided near its upper part with two annular outwardly projecting ribs 10ᵇ and 10ᶜ between which there is mounted a metallic clamping ring 12 having flanges 12ª which project outwardly on opposite sides of the upper body portion of a handle 13. The handle rests upon the upper rib 10ᵇ and upon a shoulder 10ᵈ formed on the vessel some distance below the lower rib 10ᶜ and it is clamped in place between the flanges 12ª of the ring by means of bolts 14. There is thus provided a portable water-containing vessel having a convenient handle by which it may be readily moved about.

The water in the vessel 10 is adapted to be heated and vaporized by any suitable electrical device. In the present embodiment, this is illustrated as a heating device of the liquid conductor type in which a pair of spaced electrodes are mounted in the bottom of the vessel and provided with means for connecting them in an electric circuit, so that when the connection is established the current flows between the electrodes and thereby heats and vaporizes the water, which operation continues until the water is entirely evaporated, thereby shutting off the current and giving the apparatus a definite time period of operation. The two electrodes 15 and 16 are mounted one above the other in the bottom of the vessel, the electrode 15 resting directly on the lower surface of the vessel and having welded thereto a pair of depending terminal posts 17 which extend through holes in the bottom wall of the vessel, being engaged at their lower ends by washers 18 and nuts 19. One of these posts is provided with an additional washer 18$^a$ and an additional nut 19$^a$ so that a supply conductor 20 may be clamped between the lower washer and the upper nut to connect the lower electrode in an electric circuit. The two supply conductors from this circuit are preferably formed in a flexible cord 21 which leads through an aperture in the lower flange 10$^a$ of the vessel and the other supply conductor 22 is clamped to the lower end of a center post 23 which extends through a centrally located aperture in the bottom wall of the vessel with its enlarged threaded upper part 23$^a$ having a threaded engagement with a washer 24 which is seated in a recess in the lower part of the vessel within an annular rib 10$^e$ which is formed on the lower wall of the vessel. The upper electrode 16 rests upon an annular rib 10$^f$ formed on the lower wall of the vessel adjacent its outer margin. This electrode is provided at its center with an upturned flange 16$^a$ forming a hub which has a threaded engagement with the upper portion 23$^a$ of the center post. The upper electrode is thus detachably mounted and when it is in its lowermost position resting upon the flange 10$^f$ it is spaced from the lower electrode 15. The center post 23 is clamped in position within the bottom wall by a washer 25 and a nut 26 and the lower threaded portion of this post is also engaged by another washer 25$^a$ and another nut 26$^a$ so that the other supply conductor 22, previously referred to, may be clamped between the washer 25$^a$ and the upper nut. The connections to the terminal posts of the supply conductors are enclosed by a cover plate 27 which may carry printed matter giving instructions regarding the use of the apparatus, the name of the manufacturer, and the like. This cover plate seats against an annular shoulder 10$^g$ formed on the inner part of the flange 10$^a$ of the vessel and it is held in place by a washer 28 mounted on the center post and secured in position by a nut 29 which engages the lower end of the center post.

The upper electrode 16 is provided on its upper side with an insulating plate 30 formed of porcelain or the like which is provided with a plurality of integral downwardly projecting lugs 30$^a$ having upwardly extending recesses therein which are engaged by spring clips 16$^b$ formed on the upper electrode, thus detachably holding the insulating plate in position on the electrode. The electrode 16 is provided with a plurality of apertures 16$^c$ which are adapted to permit the escape of bubbles which are formed between the electrodes by the heating of the water due to the passage of electric current therethrough, and the insulating plate 30 is provided with similar apertures 30$^c$ which permit the escape of the bubbles upwardly through the body of water in the vessel. The plate 30 and the upper electrode 16 may be removed together by unscrewing the electrode from the center post 23 and when these plates are in place, as shown in Fig. 1, the plate 30 protects the fingers of the user from contact with the electrodes which are connected in the electric circuit.

The vessel 10 is provided at its upper end with an annular surface 10$^h$ which is preferably ground off so that it is accurately positioned in a horizontal plane to make a close contact with the similar annular ground surface 35$^a$ formed on the cover 35. This cover is also formed preferably of porcelain or other insulating material except that it is provided with a centering flange or guide 36 in the form of an inverted metal cup which extends downwardly and has a loose engagement with the upper end of the vessel 10, thereby serving to guide the cover and to position it loosely in its proper location on the vessel. This guide 36 seats against an annular shoulder 35$^b$ which is located within and offset upwardly from the annular surface 35$^a$, and the guide is held in fixed position to the cover 35 by a bolt 37 which has its head seated in a handle 38 and which has a lower threaded end engaged by a nut 39 below the top plate 36$^a$ of the guide member. This top plate 36$^a$ is provided with one or more apertures 36$^b$ through which the steam generated in the vessel 10 rises upwardly and into the chamber 40 of the cover 35. The cover 35 has a hollow central neck or stem 35$^c$ engaged at its upper end by the handle 38 and forming the upper part of the chamber 40. This neck or stem is provided on one side with a discharge orifice 35$^d$ through which steam from the chamber 40 is discharged outwardly in a general horizontal direction immediately above a receptacle 35$^e$ which is provided for containing a quantity of a medicament 41 in a position where it is located on the outside of the cover exposed to the atmosphere. The wall of this receptacle is preferably provided with a shoulder 35$^f$ which serves as a guide for indicating the level to which the receptacle should be filled with medicament and the medicament in this receptacle is adapted to be heated by the steam in the chamber 40 as well as by that in the upper part of the vessel 10. Owing to the likelihood that some of the medicament may be spilled in the process of placing it in the receptacle 35$^e$ and to the possibility that some of it may condense around the upper margin of this receptacle, the cover 35 is provided around its outer margin with an annular trough 35$^g$ which is adapted to catch any of the medicament which is spilled or which escapes from the receptacle 35$^e$. In this way, the medicament is prevented from running down the outside of the vessel or from entering the interior thereof.

In the operation of the device the cover 35, which is held in place by gravity only, may be readily removed by seizing the handle 38 and then a measured quantity of water is placed in the vessel 10 so that it will have the desired period of operation, depending upon the time required for the evaporation of the water. The cover 35 is then replaced and a quantity of the medicament 41 is placed in the receptacle 35$^e$, preferably an amount sufficient to bring the level up to the shoulder 35$^f$. The passage of current between the electrodes 15 and 16 then heats and vaporizes the water with the result that the steam rises and is discharged through the orifice 35$^d$. The presence of the steam below and around the walls of the receptacle 35$^e$ will cause the medicament to be vaporized so that its vapor will rise and be picked up by the current of steam passing over the surface of the liquid. The vaporization of the medicament and the mixture thereof with the steam is thus effected on the outside of the vessel and, when the device has been used for the desired period of time, the medicament may be readily cleaned from the receptacle 35e and other parts of the external surfaces of the cover so that it will be in readiness for subsequent use.

Although one form of the invention has been shown and described by way of illustration, it will be understood that it may be constructed in various other embodiments coming within the scope of the appended claims.

I claim:

1. A vaporizer comprising a vessel having a steam generating chamber, and a cover for said vessel having a receptacle for a medicament open to the atmosphere on its outer side and an orifice opening above said receptacle and adapted to discharge steam over the upper surface of the medicament in said receptacle directly to the atmosphere.

2. A vaporizer comprising a vessel having a steam generating chamber, and a cover for said vessel having a medicament-receiving receptacle open to the atmosphere on its entire upper side and adapted to be heated by steam generated in said chamber, said cover having a discharge orifice adapted to discharge steam over the surface of the medicament in said receptacle.

3. A vaporizer comprising a vessel adapted to contain water, means in said vessel for heating water to generate steam, and a cover for said vessel having an open medicament-receiving cavity on its outer side open to the atmosphere and adapted to be heated by the heat of said steam transmitted through the material of the cover, said cover having a discharge opening adapted to direct steam directly to the atmosphere over the exposed surface of the medicament in said cavity.

4. A vaporizer comprising an insulating vessel having a steam generating chamber, and a molded insulated cover seated on said vessel and having a receptacle in its outer side adapted to contain a medicament having its upper surface exposed directly to the atmosphere, the wall of said receptacle being exposed on its under side to the steam generated in said chamber, said cover having a hollow portion extending above the level of said receptacle and provided with an orifice adapted to discharge steam directly to the atmosphere over the medicament in said receptacle.

5. A vaporizer comprising an insulating vessel adapted to contain water, means for heating said water to generate steam, and an insulating cover resting by gravity on and having a ground fit with said vessel, said cover having an open recess in its outer side for containing a medicament exposed to the atmosphere and having a hollow portion extending above the level of said recess and provided with a discharge orifice adapted to discharge steam directly to the atmosphere in proximity to the upper surface of the medicament in said recess.

6. A vaporizer comprising a vessel adapted to contain water, means for heating said water to generate steam, a cover for said vessel having an open cavity in its outer side for containing a medicament exposed to the atmosphere, and means associated with said cavity for indicating the proper level for the medicament therein, said cover having a discharge orifice for directing steam to the atmosphere over the upper surface of the medicament in said cavity.

7. A vaporizer comprising a vessel adapted to contain water, means for heating said water to generate steam, and a cover mounted on said vessel having a cavity in its upper side open to the atmosphere for receiving a medicament, said cover having a steam discharge opening for discharging steam over said cavity and having an annular gutter in its upper side located outwardly of said cavity.

8. A vaporizer comprising a vessel adapted to contain water, means for heating said water to generate steam, an insulating cover seated on said vessel and having a steam discharge opening therein, a positioning member for locating said cover on said vessel, a handle for said cover, and a single means for securing said handle on said cover and for securing said positioning member in position on said cover.

9. A vaporizer comprising an insulating vessel adapted to contain water, means for heating said water to generate steam, an insulating cover resting by gravity on said vessel, an inverted cup-shaped metallic positioning member seated against the under side of said cover and having an annular flange entering said vessel, said cover and said positioning member each having a steam discharge opening therein, and means for securing said positioning member to said cover.

10. A vaporizer comprising an insulating vessel adapted to contain water, means for heating said water to generate steam, an insulating cover resting by gravity on said vessel, an inverted cup-shaped metallic positioning member seated against the under side of said cover and having an annular flange entering said vessel, said cover and said positioning member each having a steam discharge opening therein, a handle mounted on the top of said cover, and means including a bolt extending through the handle and the positioning member for securing them to said cover.

11. A vaporizer comprising an insulating vessel adapted to contain water, means in said vessel for heating said water to generate steam, a molded insulating cover having a ground fit on the upper edge of said vessel, said cover having an open molded recess in its outer side for receiving a medicament and having a central hollow portion extending above the level of said recess and provided with an orifice adapted to discharge steam directly to the atmosphere over the surface of said medicament, and a positioning member carried by the under side of said cover and extending downwardly into said vessel.

MARSHALL W. HANKS.